United States Patent
Gaul et al.

(10) Patent No.: US 8,723,477 B2
(45) Date of Patent: May 13, 2014

(54) CHARGING CABLE CONNECTOR FOR CONNECTING AN ELECTRIC VEHICLE TO A CHARGING STATION

(75) Inventors: Armin Gaul, Selm (DE); Ingo Diefenbach, Unna (DE)

(73) Assignee: RWE AG, Essen (DE)

( * ) Notice: Subject to any disclaimer, the term of this patent is extended or adjusted under 35 U.S.C. 154(b) by 33 days.

(21) Appl. No.: 13/359,081

(22) Filed: Jan. 26, 2012

(65) Prior Publication Data

US 2012/0119702 A1 May 17, 2012

Related U.S. Application Data

(63) Continuation of application No. PCT/EP2010/060166, filed on Jul. 14, 2010.

(30) Foreign Application Priority Data

Jul. 27, 2009 (DE) .......................... 10 2009 034 886

(51) Int. Cl.
*H02J 7/00* (2006.01)
*H01R 13/66* (2006.01)

(52) U.S. Cl.
USPC ...................................... 320/109; 439/620.21

(58) Field of Classification Search
CPC ......................... B60L 11/1824; B60L 11/1847
USPC ...................................... 320/109; 439/620.21
See application file for complete search history.

(56) References Cited

U.S. PATENT DOCUMENTS

| | | | |
|---|---|---|---|
| 5,200,686 A | 4/1993 | Lee | |
| 5,349,535 A | 9/1994 | Gupta | |
| 5,489,834 A * | 2/1996 | Pitkanen | 320/106 |
| 5,596,258 A * | 1/1997 | Kimura et al. | 320/163 |
| 5,696,367 A | 12/1997 | Keith | |
| 5,758,414 A | 6/1998 | Ehrenfels | |
| 6,091,223 A | 7/2000 | Rogers et al. | |
| 6,107,780 A * | 8/2000 | Kellerman | 320/132 |
| 6,210,036 B1 * | 4/2001 | Eberle et al. | 374/141 |

(Continued)

FOREIGN PATENT DOCUMENTS

| | | |
|---|---|---|
| DE | 19613793 A1 | 10/1997 |
| GB | 2 438 979 A | 12/2007 |

OTHER PUBLICATIONS

Specification: Charging Systems for Electric Vehicles; Feb. 18, 2009; 43 pages; Rev. 10; Mennekes Elektrotechnik GmbH & Co. KG/Volker Lazzaro; http://www.emfm.de/downloads/spezifikation-mennekes-ladesystem-rev10.pdf.

(Continued)

*Primary Examiner* — Drew A Dunn
*Assistant Examiner* — Nathaniel Pelton
(74) *Attorney, Agent, or Firm* — Reinhart Boerner Van Deuren P.C.

(57) ABSTRACT

The invention relates to a plug device for a charging cable for connecting an electric vehicle to a charging station, comprising a housing, electrical contacts associated with the housing for connecting to a connecting device in the charging station or in the electric vehicle, and a coding means arranged in the housing for the value of the amperage which may be transmitted via the charging cable. The invention further relates to a system consisting of a charging cable and a charging station and/or an electric vehicle as well as a charging cable equipped with the plug device.

20 Claims, 3 Drawing Sheets

(56) References Cited

U.S. PATENT DOCUMENTS

2002/0081486 A1    6/2002    Williams
2007/0126405 A1    6/2007    Kao et al.
2010/0259218 A1*  10/2010  Gale et al. .................... 320/109

OTHER PUBLICATIONS

Mennekes Plugs for the World, Charging Systems for Electric Vehicles, Requirements, Standards, Systems, Products; May 12, 2009; 16 pages; http://siblik.at/shortnews/Mennekes_Ladesys.pdf.

* cited by examiner

CHARGING CABLE CONNECTOR FOR CONNECTING AN ELECTRIC VEHICLE TO A CHARGING STATION

CROSS-REFERENCE TO RELATED PATENT APPLICATIONS

This patent application is a continuation of pending PCT Patent Application No. PCT/EP2010/060166, filed Jul. 14, 2010, which claims the benefit of German Application No. 102009034886.7, filed Jul. 27, 2009, the entire teachings and disclosure of which are incorporated herein by reference thereto.

FIELD OF THE INVENTION

The subject-matter of the invention relates to a charging cable plug for connecting an electric vehicle to a charging station, the charging cable plug comprising a housing with electrical contacts configured for connecting to a charging station and/or a vehicle. The subject-matter of the invention further relates to a charging cable comprising such a plug as well as a system consisting of the charging cable and the electrical vehicle connected thereto and/or charging station connected thereto.

BACKGROUND OF THE INVENTION

The prevalence of electric vehicles is set to increase considerably in the near future. With the prevalence of electric vehicles, new requirements are set for the supply infrastructure. Electric vehicles do not only have to be able to be supplied with electrical energy in the domestic field but also outside the domestic field. To this end, charging stations should be made available in public places, where users of electric vehicles may obtain electrical energy. The charging stations may, for example, be arranged in public parking areas, in car parks or even in private parking areas, for example in the region of the workplace of the user. Users of electric vehicles could then connect their vehicles to such charging stations. During their absence, the battery of the electric vehicles may be charged up.

A drawback with the use of stationary charging stations which are accessible in public areas is, however, that the structure of the electric vehicles is heterogenous, which means that very different electric vehicles are operated by very different plugs and plug systems.

The use of the respective plug and/or plug system substantially depends on the type of charging process desired. Thus, firstly a differentiation is made between the duration of the charging process: during a normal charging process, which lasts over a lengthy time period with a low to moderate charging current, charging cables known from the domestic field with a small or medium cable cross section are able to be used. During a rapid charging process, which takes place within a shorter time at a higher amperage, charging cables with a correspondingly larger cross section are required. For example, charging cables with a cable cross section of 6 mm$^2$ are able to be used for a maximum of 32 A, whilst such charging cables with a cross section of 16 mm$^2$, as used in rapid charging stations, are acceptable for amperages of up to 63 A.

Also a differentiation is made in the type of cable connection: the electric vehicle may be connected to the AC power supply system in the charging station, either by using a charging cable and a plug which are permanently connected to the electric vehicle, or by using a releasable cable accessory with cable connectors to the electric vehicle and to the charging station.

Generally, a conventional connection or extension cable has a plug on the one side and a coupling on its other side. Cable systems which are primarily used in the industrial field or with higher power consumers in the domestic field, are known as so-called CEE-plug connectors and exist in many variants. They are designed so that in each case the plug of one type only fits into the jack and/or socket of the same type. Thus the nature and diameter of the respective connector are dependent on the current carrying capacity, a difference being made between the amperages 16 A, 32 A, 63 A and 125 A. In the known CEE-system, it is not possible to connect plugs and sockets of different amperages to one another. In these plug connection systems, only the couplings are regarded as current conducting components and accordingly only the contacts of the couplings are designed to be insulated so that they are shockproof.

Such known CEE-plug connectors are, however, not suitable in connection with charging electric vehicles. One reason is that not only is energy able to be stored in the battery of the electric vehicle but, on the other hand, it is intended that energy is able to be transferred back from the electric vehicle to the charging station. Thus in such charging cables it is necessary that both the contacts in the coupling and the contacts in the plug are insulated so that they are shockproof. Alternatively, it is also possible to use a charging cable with two plugs.

In order to ensure a corresponding universality of the connection options, therefore, in electric vehicles the known grading of the plug and/or coupling sizes differs according to the permissible amperages, in which a small plug size corresponds to an amperage of 16 A, a medium plug size corresponds to an amperage of 32 A and a large plug size corresponds to an amperage of 63 A.

Instead, it is desirable that an electric vehicle is able to be connected by the same charging cable to a plug socket in the charging station, irrespective of how high the respective charging current is. The use of a single size for the plug connector of a charging cable, however, requires an indication of the maximum permissible amperage for the charging cable and/or the plug connector, in order to avoid overload. It is known, for such an indication, to carry out a so-called "coding" of the maximum amperage, in which an ohmic resistor is arranged within the housing of the plug connector. Different resistance values are used for different permissible amperages. At the connection of the plug connector to the electric vehicle and/or to the charging station, the value of the ohmic resistor of the respective location is determined, and the value of the maximum permissible amperage of the charging cable detected therefrom. With the knowledge of the maximum charging current to be produced by the charging station and also taking into account the amount of energy required by the electric vehicle, a synchronisation then takes place by the optimal charging current under the given conditions being set, said charging current being determined by the weakest link in the chain of the total charging circuit.

However, the disclosed coding of the maximum permissible amperage of the charging cable has the drawback that only specific discrete numerical values of the amperage may be predetermined. In the case of a deterioration of contacts by ageing processes or corrosion of the plug connector, which lead to increased resistance in the region of the plug connector, therefore, a risk of accident occurs, up to and including the combustion of the plug connection. The primary cause is that by the greater heat losses in the region of the deteriorated contact connection, an impermissible temperature increase occurs, when a charging current is used which corresponds to the predetermined fixed coding value.

The object of the present invention is to improve a device and/or a system of the aforementioned type so that greater safety may be achieved against the disclosed thermal risks.

SUMMARY OF THE INVENTION

This object is achieved by a plug device for connecting an electric vehicle to a charging station, which has the following features:
- a housing,
- electrical connection contacts for a connecting device in the charging station or in the electric vehicle,
- a coding means arranged in the housing for the value of the amperage which may be transmitted via the charging cable,
- temperature detection means arranged in the region of the housing,
- an evaluation device for calculating a temperature-corrected coding value and
- a communication means for the transmission thereof to a charging current control device.

Moreover, this object is further achieved by a charging cable equipped with such a plug device.

Moreover, this object is further achieved by a system consisting of a charging cable equipped with such a plug device, as well as an electric vehicle with a receiving device for the connection plug.

This object is further achieved by a system consisting of a charging cable equipped with such a plug device, and a charging station suitable for an electric vehicle with a receiving device for the plug device.

The invention is characterised in that by the temperature detection in the region of the plug device, i.e. either directly in the plug housing or in the immediate surroundings thereof, for example in the receiver device associated therewith, a correction may take place of the value of the maximum permissible current predetermined by the coding means. When a temperature alteration is detected in the region of the plug housing and/or the receiver device, for example as a result of ageing or corrosion processes, the predetermined value of the coding means for the amperage is correspondingly corrected. In particular, when a temperature which is higher relative to room temperature is detected, a corresponding reduction of the charging current is effected. As a result, the charging time is optionally significantly lengthened, but completely switching off the charging current circuit may be dispensed with, which would otherwise take place in the event of thermal overload in the charging station.

An embodiment of the invention provides that the coding means and the temperature detection means are assigned to a common evaluation device, as the output signal thereof of the temperature-corrected coding value may be further processed.

An advantageous and highly accurate implementation is possible when the temperature detection means contains a thermoelement.

When the temperature detection means is arranged in the connection device, in particular in a plug socket, of the charging station or of the electric vehicle, defects as a result of ageing or corrosion may be compensated, the cause thereof being located at this point.

When the temperature detection means is arranged in the housing, defects as a result of ageing or corrosion may be compensated, the cause thereof being located in the housing.

A particularly advantageous solution results when the temperature detection means is a temperature-dependent electrical resistor, in particular a thermistor, which according to requirements may have a positive or negative temperature coefficient.

An ohmic resistor is suitable as coding means, relative to which the thermistor may be arranged in parallel or in series.

In each case a specific ohmic resistance value may correspond to each value for the permissible amperage (16 A, 32 A, 63 A) of the charging cable.

The temperature characteristic curves of the circuit device, for example formed by the thermistor and ohmic resistor, in each case are preferably selected and synchronised with one another such that in each case non-overlapping regions result for different amperage values. This means that with a specific amperage, for example 32 A, the maximum alteration of the total resistance value of the circuit as a result of temperature is such that the value range does not coincide with the value range which applies to a different amperage. As a result, within the entire temperature range in question, there is always able to be a clear association with the "nominal" current of the charging cable used.

It is further preferred that, in addition to the power transmission line for the charging current, a pilot signal line for the control signals is provided, within the scope of which the temperature-corrected coding value may be transmitted to the charging control device on the vehicle side.

The coding means may thus be arranged both between a pilot signal connector and the protective earth conductor of the pilot signal line, for example an earth conductor, and between two connectors of the pilot signal line.

An embodiment which may preferably be used in practice, provides that the coding means is associated with the "plug present" connector of the plug device.

A plug device designed according to the invention preferably forms in each case one of the two ends of a charging cable. Here, connections may be made to one respective receiving device on the electric vehicle and on the charging station.

In order to establish whether the amperage drawn from the electric vehicle corresponds to the permitted amperage corresponding to the temperature-corrected coding value, a current detection means is provided on the charging station for, in particular, phase-related detection of the current used by the electric vehicle, the current detection means preferably being a component of an energy meter.

BRIEF DESCRIPTION OF THE DRAWINGS

The subject-matter of the present invention is described in more detail hereinafter with reference to the drawings, in which.

DETAILED DESCRIPTION OF THE INVENTION

Figure 1:
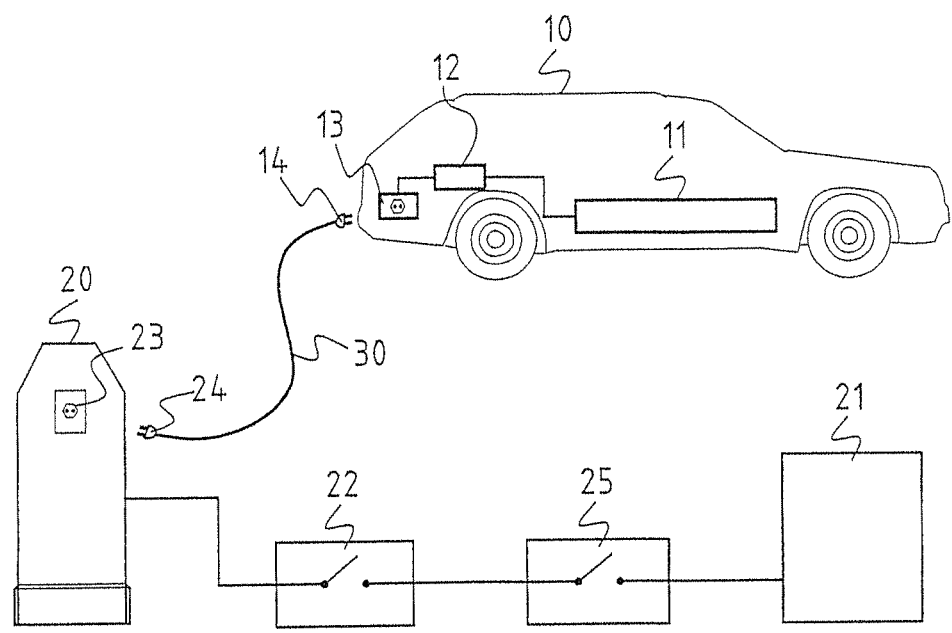
FIG. 1 shows a block diagram for the construction of a system consisting of an electric vehicle and a charging station connected thereto via a charging cable and FIG. 2 shows a detailed view of a plug device according to an exemplary embodiment of the invention.

The invention relates to a plug device for a charging cable 30 for connecting an electric vehicle 10 to a charging station 20, comprising a housing 40, electrical contacts 41 associated with the housing 40 for connecting to a connecting device 13, 23 in the charging station 20 or in the electric vehicle 10, and a coding means 42 arranged in the housing 40 for the value of the amperage which may be transmitted via the charging cable 30. The invention further relates to a system consisting of a charging cable 30 and a charging station 20 and/or an electric vehicle 10 as well as a charging cable equipped with the plug device. The object of the present invention is to achieve greater safety with regard to thermal overload. This object is achieved by the following features: a coding means 42 arranged in the housing 40 for the value of the amperage which may be transmitted via the charging cable 30, temperature detection means 42a arranged in the region of the housing 40, an evaluation device 43 for calculating a temperature-corrected coding value and a communication means 44 for the transmission thereof to a charging current control device 12.

In FIG. 1 an electric vehicle 10 is shown, which comprises a battery 11, which is charged up via a charging current control device 12. To this end, the electric vehicle 10 is connected via a charging cable 30 to a charging station 20.

The charging cable 30 has on both ends thereof one respective plug device 14, 24, the plug 14 of the one end being able to be connected to a plug socket 13 on the electric vehicle 10 and the plug 24 of the other end of the charging cable 30 being able to be connected to a plug socket 23 in the charging station 20.

The charging station 20 has an electrical power supply from an energy power supply device 21. The power is supplied via a supply line which is switched on and off by means of a contactor 22 and is protected by a circuit breaker and/or an RCD 25. The electrical energy drawn by the vehicle 10 is detected by an energy meter (not shown) in a correspondingly known manner.

Figure 2:
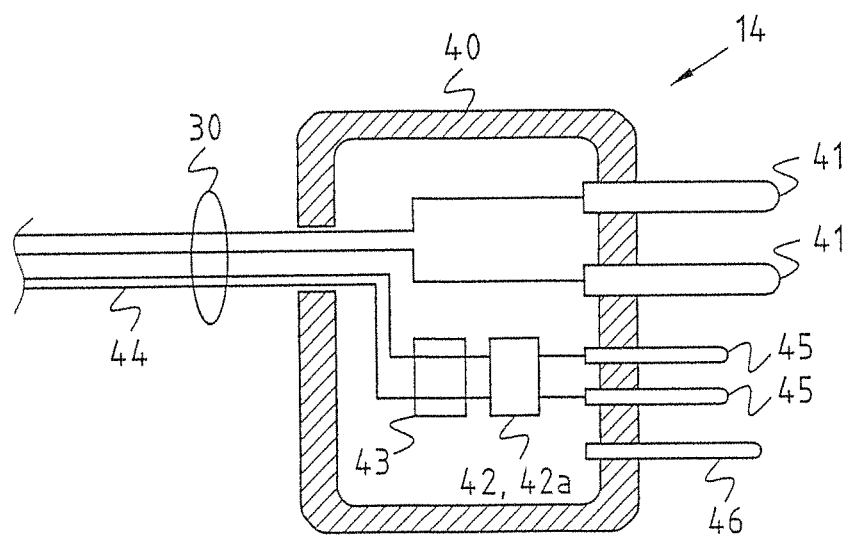

FIG. 2 shows in a detailed view a section through a plug device 14 of the charging cable 30. Said plug device has a housing 40 into which, on the one hand, the power lines, for example L1, L2, L3, N, PE, for the charging current of the charging cable 30 feed and the output thereof being formed by electrical contacts 41, which may be brought into releasable connection with the corresponding plug socket, in the embodiment the plug socket 13 of the electric vehicle 10. Moreover, the plug device 14 comprises further electrical contacts 45 which are used for connecting at least one pilot signal line 44 for the transmission of pilot signals. Finally, an auxiliary contact 46 is provided in the plug device 14, which is a so-called "plug present" contact, i.e. a contact having the function of displaying whether a plug is present or not.

The charging current flows in the known manner from the charging cable 30 through the corresponding components of the plug device 14 via the electrical contacts 41 thereof into the lines leading via the charging current control device 12 to the battery 11 of the electric vehicle 10.

Figure 3A:
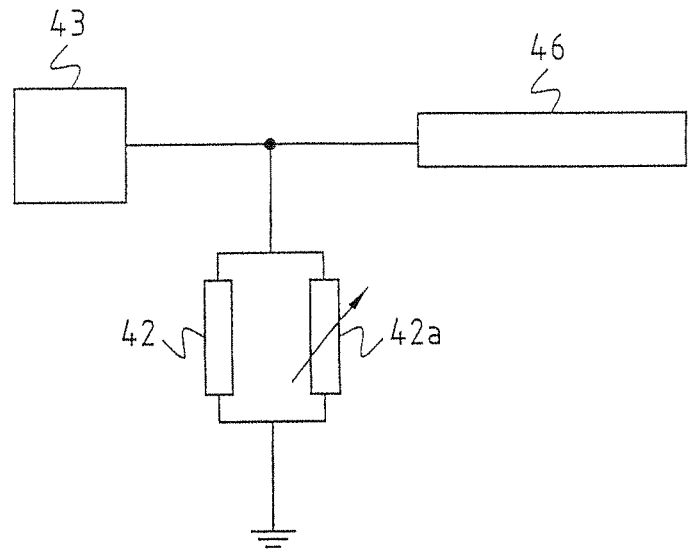
FIGS. 3a, 3b show electric circuit diagrams for arranging the temperature-corrected coding means.
Figure 3B:
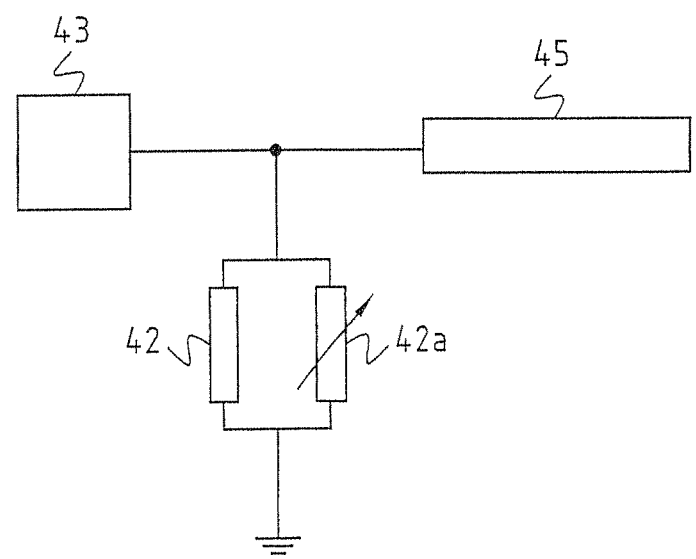

Within the housing 40, an electric circuit is arranged consisting of an ohmic resistor 42 and a thermistor 42a arranged in parallel. FIGS. 2, 3a and 3b show in each case variants of the arrangement of this parallel circuit. The parallel circuit consisting of the ohmic resistor 42 and the thermistor 42a arranged in parallel thereto may, as one option, (FIG. 2) be arranged between two pilot signal lines 45. Alternatively, said parallel circuit may, as one option, (FIG. 3a) be arranged between the "plug present" connector 46 and earth or between a pilot signal connector 45 (FIG. 3b) and earth. In each of the three cited cases for the arrangement of the circuit, an evaluation device 43 is arranged downstream of the two components 42, 42a. The circuit arranged in the evaluation device 43 has the purpose of detecting the total resistance value of the parallel circuit of the components 42, 42a and to generate therefrom a control signal for the permitted temperature-corrected amperage of the charging cable 30.

Figure 4:
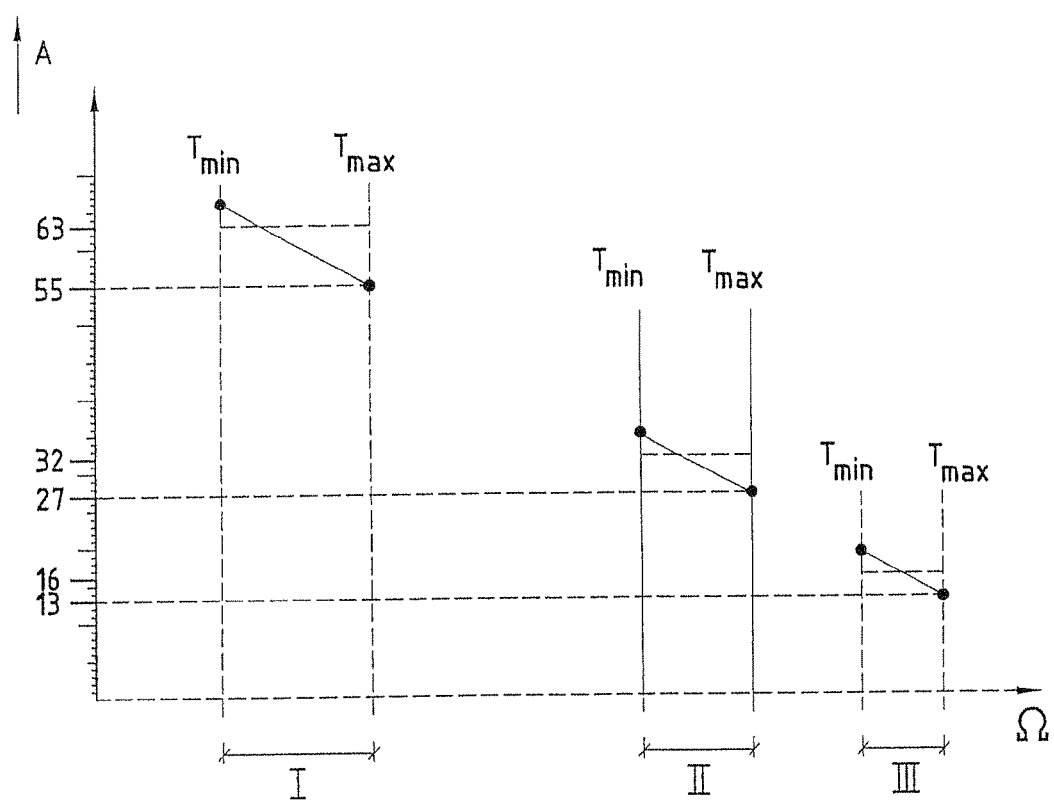
FIG. 4 shows a graphic representation of the temperature characteristic curves with different amperage values.

This is described in more detail in connection with FIG. 4: FIG. 4 shows a family of characteristics, in which each curve is assigned to a specific reference amperage of the charging cable 30. The upper curve relates to the amperage 63 A, the middle curve to the amperage 32 A and the lower curve to the amperage 16 A. The measured value of the total resistance is applied to the abscissa of the diagram. The horizontal dotted characteristic curves correspond to the values of the respective resistance without taking into account the temperature dependency, whilst the solid characteristic curves take into account the temperature-dependent alteration of the total resistance. Within the respective temperature interval defined by an upper (Tmax) and a lower (Tmin) temperature limit, three regions I, II, III may be defined. By means of the evaluation device 43 a correlation is made between the measured total resistance and the temperature-corrected reference amperage. For example, according to the upper characteristic curve the permitted amperage is reduced relative to the nominal value of 63 A at room temperature to a value of, for example, 55 A at the upper temperature limit Tmax. The same applies to the curves of the lower amperages. The measurement of the ohmic resistance values and the respective temperature-dependent resistors takes place such that the values between the regions I, II, III do not coincide, so that in the entire temperature range there is a clear correlation between the measured total resistance value and the permitted amperage.

The device shown operates as follows:

When the user of the electric vehicle 10 wishes to charge the battery 11, the plug socket 13 is connected to a charging cable 30, in which the plug 14 is inserted into the plug socket 13. Similarly, in the selected charging station 20 which is, for example, a public charging station in the region of a car park, the other end of the charging cable 30 is inserted with the plug 24 into the plug socket 23 of the charging station 20.

The charging cable 30 used by the vehicle user comprises a specific copper cross section of its cable lines, whereby the maximum permissible electrical amperage which may flow via the charging cable 30 is defined. For coding, i.e. establishing, this value, the charging cable 30 has in the region of at least its two plugs 14, 24 an ohmic resistor 42, the nominal value thereof being clearly assigned to the permissible amperage. A specific ohmic resistance value corresponds, therefore, to each nominal amperage value, for example 16 A, 32 A or 63 A, for a charging cable 30. By the coupling of the ohmic resistor 42 in terms of circuit technology, to a temperature-dependent resistor formed by the thermistor 42a, a total resistance value results, the value thereof—according to the selected temperature measuring point—depending on the temperature prevailing in the housing 40 of the plug 14 or its surroundings.

Via the pilot signal line 44 this value may be detected metrologically in the electric vehicle 10 or in the region of the charging station 20. Based on the detected value, both components (electric vehicle 10, charging station 20) are synchronised with the maximum permitted charging current for the system. This is determined by the weakest link in the chain, consisting of the charging line for the electric vehicle, the charging cable 30 and the charging circuit of the charging station 20.

The alteration of the coding value for the amperage as a result of temperature detected by the evaluation device 43 as disclosed above, has the result that with a temperature increase, for example by defective or ageing plugs with poor contact behaviour, a lower permissible amperage for the charging cable 30 is signalled. This temperature-corrected coding value is now transmitted via the pilot signal line 44 to the charging current control device 12 in the electric vehicle 10, whereby a reduced amperage is set relative to the reference amperage of the charging cable 30, for example 32A, with which the vehicle is now charged. This has the result that in the entire system—formed by the electric vehicle, the charging cable and the charging station—the amperage used for the charging process may be selected to be lower than it might be in a defect-free state of the charging cable connection. As a result, the entire system is protected from thermal overload, without the entire charging process having to be interrupted. Thus the charging process may be continued by taking into account a longer charging time relative to the defect-free state.

In the charging station 30 it is now verified via the electric meter 22, whether the amperage set by the charging control device 12 in the electric vehicle 10 also actually corresponds to the amperage which corresponds to the synchronisation between the individual components, and which additionally conforms to the conditions of the contract agreed by the vehicle user. If in this case an unauthorised deviation results, the current supply may be interrupted in the charging station 30 by the contactor 22 being switched off. A corresponding monitoring may take place not only via the respective phase current but also via the detection of the power value used by the vehicle.

Within the scope of the present invention, the positioning of the temperature detection means is not only directly in the plug housing but also at a location of the charging cable connection outside the region of the plug, for example in the region of a plug socket. By the choice of the respective measuring location, a corresponding localisation of defects may take place and corresponding measures, for example the replacement of the charging cable as such or the replacement or the repair of individual components thereof, may be initiated.

Also, the possibility is provided to communicate a detected defect of the charging cable to the respective user, the identity thereof being known to the power supply company, in order to carry out the replacement or repair of the defective charging cable.

The invention claimed is:

1. Plug device for connecting an electric vehicle on a vehicle side via a charging to a charging station on a charging side, comprising:
   a housing;
   electrical connection contacts for connecting to a connecting device in the charging station or in the electric vehicle;
   a coding means arranged in the housing for the value of the amperage which may be transmitted via the charging cable;
   a temperature detection means arranged in the region of the housing;
   an evaluation device for calculating a temperature-corrected coding value;
   a communication means for the transmission thereof to a charging current control device;
   wherein the temperature detection means is a thermistor;
   wherein the coding means is an ohmic resistor;
   wherein a specific ohmic resistance value is assigned to each value for a permissible amperage of the charging cable;
   wherein the ohmic resistance values and the temperature characteristic curves of the circuit device consisting of the thermistor and ohmic resistor in each case are selecting and synchronised with one another, such that in each case non-overlapping regions result for different amperage values.

2. Plug device according to claim 1, wherein the coding means and the temperature detection means are assigned to a common evaluation device.

3. Plug device according to claim 1, wherein the temperature detection means contains a thermoelement.

4. Plug device according to claim 1, wherein the temperature detection means is arranged in the housing.

5. Plug device according to claim 1, wherein the thermistor has a positive temperature coefficient.

6. Plug device according to claim 1, wherein the thermistor has a negative temperature coefficient.

7. Plug device according to claim 1, wherein the thermistor is arranged in parallel with the ohmic resistor.

8. Plug device according to claim 1, wherein the thermistor is arranged in series with the ohmic resistor.

9. Plug device according to claim 1 further comprising a pilot signal line, by means of which the temperature-corrected coding value may be transmitted to the charging control device on the vehicle side.

10. Plug device according to claim 9, wherein the coding means is arranged between a pilot signal connector and a protective earth conductor of the pilot signal line.

11. Plug device according to claim 9, wherein the coding means is arranged between two connectors of the pilot signal line.

12. Plug device according to claims 9, wherein the coding means is associated with a plug-present connector.

13. Charging cable equipped with a plug device according to claim 1.

14. System, comprising a charging cable including a plug device according to claim 1 and an electric vehicle comprising a receiving device for the housing of the plug device.

15. System comprising of a charging cable including a plug device according to claim 1, and a charging station comprising a receiving device in particular a plug socket, for the housing of the plug device.

16. System of claim 14 wherein the temperature detection means is arranged in a connection device of the electric vehicle.

17. System of claim 15 wherein the temperature detection means is arranged in a connection device of the charging station.

18. System according to claim 15, wherein the charging station comprises current detection means for phase-related detection of the current used by the electric vehicle.

19. System according to claim 15, wherein the current detection means is assigned to an energy meter.

20. System according to claim 15, wherein the charging station comprises means for phase-related detection of the power value used by the electric vehicle.

* * * * *

UNITED STATES PATENT AND TRADEMARK OFFICE
CERTIFICATE OF CORRECTION

| | |
|---|---|
| PATENT NO. | : 8,723,477 B2 |
| APPLICATION NO. | : 13/359081 |
| DATED | : May 13, 2014 |
| INVENTOR(S) | : Gaul |

Page 1 of 1

It is certified that error appears in the above-identified patent and that said Letters Patent is hereby corrected as shown below:

In the Claim

Claim 1
Line 45, after "via a charging" insert the word --cable--

Signed and Sealed this
Twenty-ninth Day of July, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,723,477 B2 | Page 1 of 1 |
| APPLICATION NO. | : 13/359081 | |
| DATED | : May 13, 2014 | |
| INVENTOR(S) | : Gaul | |

It is certified that error appears in the above-identified patent and that said Letters Patent is hereby corrected as shown below:

In the Claim

Column 7, Claim 1
Line 45, after "via a charging" insert the word --cable--

This certificate supersedes the Certificate of Correction issued July 29, 2014.

Signed and Sealed this
Nineteenth Day of August, 2014

Michelle K. Lee
*Deputy Director of the United States Patent and Trademark Office*